United States Patent
Inman et al.

(10) Patent No.: US 6,993,423 B2
(45) Date of Patent: Jan. 31, 2006

(54) METHOD FOR ADJUSTING VEHICLE COCKPIT DEVICES

(75) Inventors: Robert R. Inman, Rochester Hills, MI (US); Robin Stevenson, Bloomfield, MI (US); Clark E McCall, Ann Arbor, MI (US)

(73) Assignee: General Motors Corporation, Detroit, MI (US)

( * ) Notice: Subject to any disclaimer, the term of this patent is extended or adjusted under 35 U.S.C. 154(b) by 153 days.

(21) Appl. No.: 10/324,468

(22) Filed: Dec. 19, 2002

(65) Prior Publication Data

US 2004/0122574 A1   Jun. 24, 2004

(51) Int. Cl.
    *G06F 7/00*    (2006.01)

(52) U.S. Cl. .................... 701/49; 701/45; 701/46; 701/47; 701/36; 280/735; 280/734; 280/728.1; 180/271; 180/273; 180/268; 307/10.1; 318/286; 318/466; 318/467; 318/468

(58) Field of Classification Search .................. 701/49, 701/45, 46, 47, 36; 280/735, 728.1, 734; 318/286, 466, 467, 468; 180/271, 273, 268; 307/10.1
See application file for complete search history.

(56) References Cited

U.S. PATENT DOCUMENTS

| 4,204,255 A | 5/1980 | Cremer |
| 4,267,494 A | 5/1981 | Matsuoka et al. |
| 4,404,632 A | 9/1983 | Harada et al. |
| 4,811,226 A | 3/1989 | Shinohara |
| 5,254,924 A | 10/1993 | Ogasawara |
| 5,670,853 A | 9/1997 | Bauer |
| 5,748,473 A | 5/1998 | Breed et al. |
| 5,822,707 A | 10/1998 | Breed et al. |
| 5,859,593 A | 1/1999 | Takemura et al. |
| 6,042,145 A | 3/2000 | Mitschelen et al. |
| 6,055,473 A | 4/2000 | Zwolinski et al. |
| 6,078,854 A | 6/2000 | Breed et al. |
| 6,134,492 A | 10/2000 | Breed et al. |
| 6,282,475 B1 | 8/2001 | Washington |
| 6,293,584 B1 | 9/2001 | Levine |

*Primary Examiner*—William A. Cuchlinski, Jr.
*Assistant Examiner*—Olga Hernandez
(74) *Attorney, Agent, or Firm*—Kathryn A. Marra

(57) ABSTRACT

A method for adjusting a plurality of vehicle cockpit devices via a two-part process that utilizes device position constraints to determine candidate arrangements and then, ultimately, recommended arrangements of the vehicle cockpit devices to determine a desired setting of the various devices. The position constraints are determined using positioning data obtained from an occupant. An exploratory search routine is used to determine the candidate arrangements with the cockpit devices being moved to each candidate arrangement so that the occupant can be queried concerning the desirability of each such arrangement. The occupant's responses are then stored for later retrieval. Thereafter, a plurality of recommended arrangements of the cockpit devices are determined using a meta-heuristic pattern search along with a neural network search accelerator that permits screening of each recommended arrangement. The occupant can then select one of the recommended arrangements as a final positioning arrangement of the cockpit devices.

18 Claims, 4 Drawing Sheets

METHOD FOR ADJUSTING VEHICLE COCKPIT DEVICES

TECHNICAL FIELD

The present invention relates to automated methods for adjusting vehicle cockpit devices to the individual characteristics of a vehicle occupant.

BACKGROUND OF THE INVENTION

Many of the vehicle cockpit devices used in automobiles today are made adjustable to allow for increased occupant comfort. Such devices include the driver seat, steering wheel, pedals, seat belt restraints, and rearview mirrors including both interior and exterior. Some of these devices can be positioned with multiple degrees of freedom, the driver's seat being an example, whereas the driver's pedals and certain other devices are typically only adjustable linearly along a single path. While some devices may be electronically adjustable and others manually adjustable by the occupant, the use of motors for electronic adjustment is becoming increasingly common, and this allows for such other features as memory positioning systems so that a particular driver can return the various cockpit devices to a preselected stored position.

More recently, work has been done in the automotive industry to give vehicles the ability to recognize and/or adapt to an individual's morphology for such characteristics as height, weight, and lengths of individual limbs. This recognition occurs by either sensing a person's morphology via on-board sensory mechanisms, or possibly by allowing the occupant to input the information while in the vehicle. By whatever approach used, this information is utilized to provide automatic adjustment of various cockpit devices in an effort to assist the occupant in determining an optimum arrangement of the devices.

A complicating factor in automating the adjustment of multiple cockpit devices is the interrelationship among positioning of many of the devices. For example, seat position for the driver will influence the desired pedal position. To obtain maximum occupant comfort, these interrelationships should be accounted for by the algorithm used to adjust the various devices.

SUMMARY OF THE INVENTION

The present invention is directed to a method for adjusting a plurality of vehicle cockpit devices via a two-part process that utilizes device position constraints to determine candidate arrangements and then, ultimately, recommended arrangements of the vehicle cockpit devices to determine a desired setting of the various devices. The position constraints are determined using positioning data obtained from an occupant, and this data can be obtained in any of a number of different ways, including via sensors or by direct input from the occupant. Each candidate arrangement of the cockpit devices is determined so that it satisfies the position constraints determined for the particular occupant. The cockpit devices are moved to each candidate arrangement and the occupant is queried concerning the desirability of each such arrangement. The occupant's responses are then stored for later retrieval. Once this is complete, a plurality of recommended arrangements of the cockpit devices are determined using the candidate arrangements and at least some of the occupant's responses. As for the candidate arrangements, the cockpit devices are moved to each recommended arrangement and the occupant is queried concerning the desirability of each such arrangement. The occupant can then select one of the recommended arrangements as a final positioning arrangement of the cockpit devices.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

Figure 1:
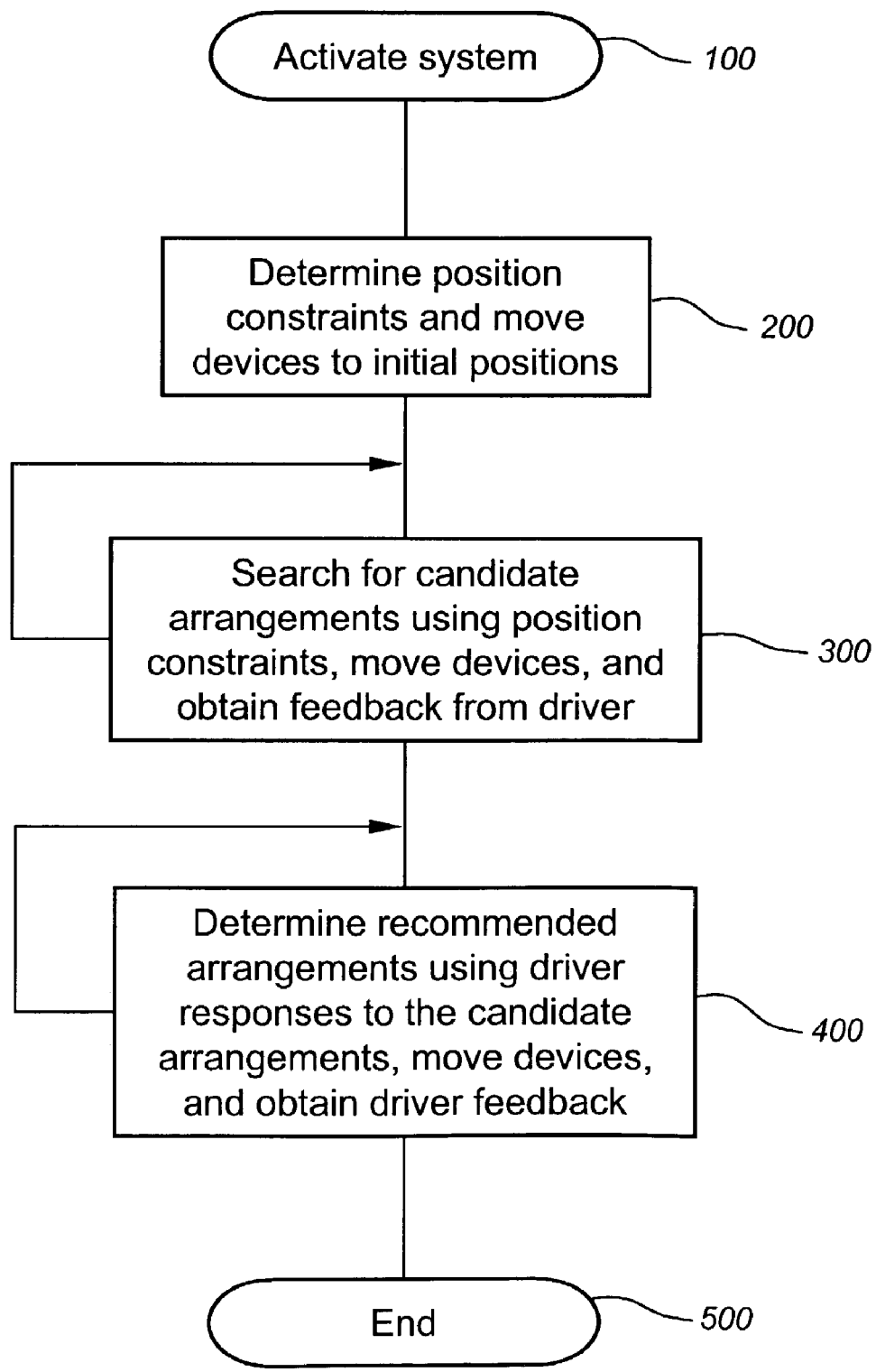
FIG. 1 is a flow chart of a preferred embodiment of the cockpit device adjustment method of the present invention.

A preferred embodiment of the method of the present invention is shown generally in FIG. 1 as it would be used for an occupant driver. The method of this embodiment is designed to efficiently find a comfortable and personalized cockpit arrangement with only minimal knowledge needed by the driver of the adjustability of the various cockpit devices. The method is carried out interactively with the driver, and the method steps are handled by a computer-controlled system connected to each of the adjustable devices. Such systems are known to those skilled in the art and need not be detailed here. It is sufficient to note that the method of the invention, including the illustrated method of the preferred embodiment, can be implemented by suitable programming of the known computer-controlled system, and the various techniques described herein for providing information between the driver and the system can be implemented in any of a number of ways that will be apparent to those skilled in the art.

The process begins at step 100 when the driver activates the system. The system obtains positioning data from the driver concerning one or more morphological characteristics of the driver and, using this data along with predetermined limits of travel for the various cockpit devices, determines position constraints for each of the devices and moves the devices to an initial position. This is shown at step 200. Then, at step 300, the system searches for a plurality of candidate arrangements of the cockpit devices, with each candidate arrangement satisfying the position constraints. The position data for the occupant can be used in selecting the candidate arrangement, although this is not necessary as long as the candidate arrangements meet the position constraints. For each of the candidate arrangements, the cockpit devices are moved to the positions specified by that arrangement, and the driver is then queried concerning the desirability of that candidate arrangement. The driver responses are obtained and stored for future recall. Using the candidate arrangements and the driver's responses to the desirability of those arrangements, the system then determines a plurality of recommended arrangements of the cockpit devices. This is shown at step 400. Again, the driver is queried concerning the desirability of each recommended arrangement, and the driver's responses are saved and stored for future recall. The process finishes at step 500 either by the driver selecting one of the recommended arrangements or by the system terminating the search for recommended arrangements on the basis of, for example, convergence of the recommendations after a preselected number of recommendations have been made. As indicated by the loops in FIG. 1, the processes used to determine candidate and recommended arrangements can be carried out iteratively, with the system determining one arrangement, moving the devices to the positions defined by that arrangement, querying the driver as to the desirability of the arrangement, and then storing the driver's responses for use in determining a subsequent arrangement. This process will be described in greater detail in connection with FIGS. 3 and 4.

Figure 2:
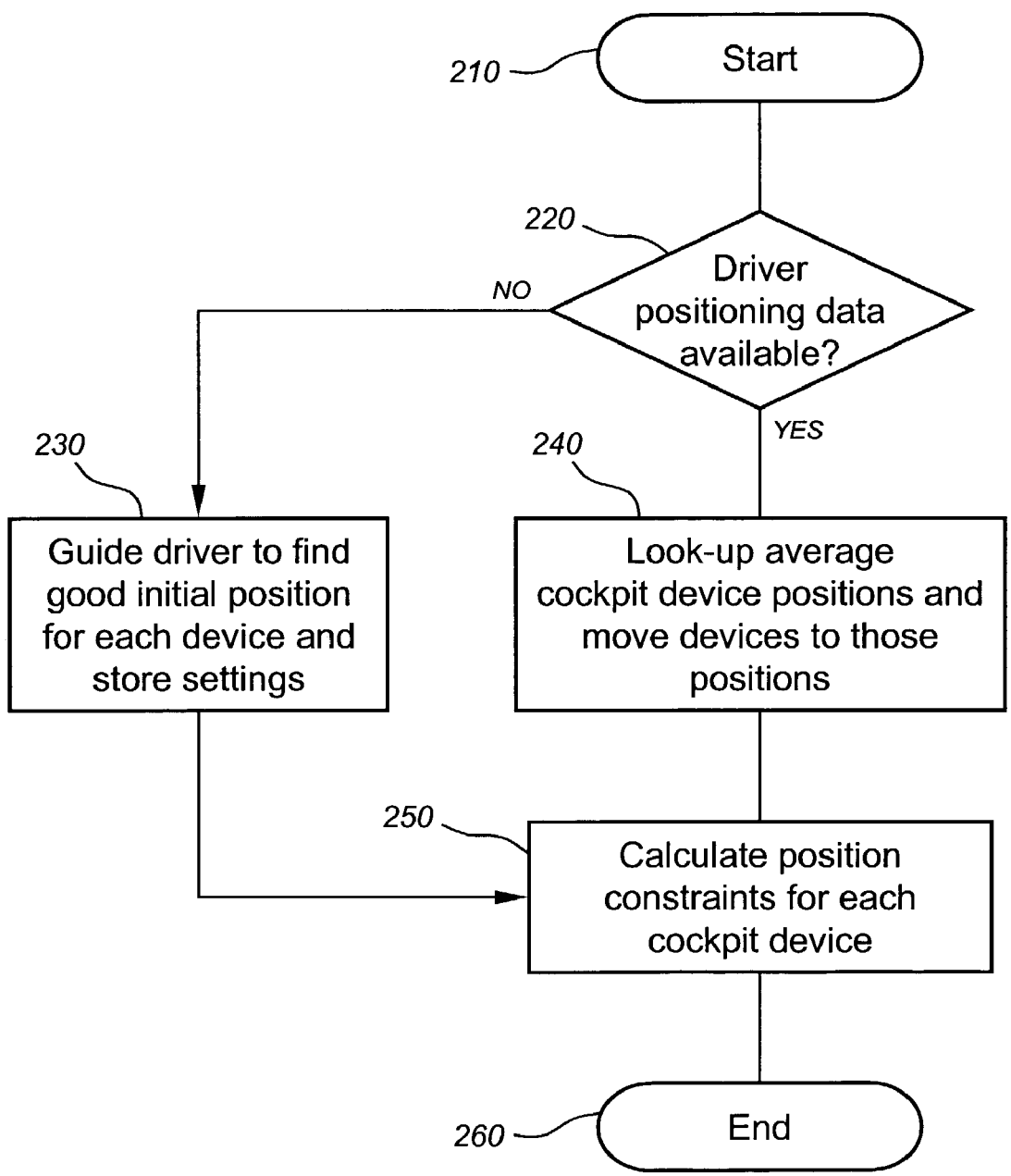
FIG. 2 is a flow chart depicting the process used in FIG. 1 to determine cockpit device position constraints.

Referring now to FIG. 2, there is shown further details of the step 200 for determining the position constraints and moving the cockpit devices to an initial position. The process starts at 210 and the first step is to determine whether driver positioning data is available, as indicated at 220. This positioning data can include such things as the driver's height and weight, the distance from the bottom of the driver's heel to his or her inner knee while the driver is seated, the distance from the seat back to the driver's inner knee while the driver is seated, and/or the distance of the driver's arm length from armpit to wrist line. Other morphological characteristics of the driver can be used as well. The positioning data can be obtained by measurements of the driver using onboard sensors (cameras, ultrasonic sensors, etc.) or by querying the driver for the information and receiving it via any suitable input device, including voice recognition, a dedicated input device, any of the existing driver controls within the vehicle, a portable device such as a personal digital assistant, or an offboard source via a wireless link, e.g., a cellular phone link. It can also be provided via another source such as a third party who inputs the information into the system.

If driver positioning data is not available, then the process moves to block 230 where the system guides the driver to find a good initial position for the cockpit devices by adjusting each of the devices, with this position then being stored for use in determining the position constraints. As an example, the following process can be used to determine a good initial position for the driver:

i. adjust the seat back angle to its most vertical position;
  ii. move the seat vertically so that top of the driver's head is one inch from the roof or until seat is in highest position;
  iii. indicate to the system that this step is done so that these two positions can be stored;
  iv. move the seat module front or back so that the driver's foot rests comfortably on the brake pedal;
  v. indicate to the system that this step is done so that this position can be stored;
  vi. adjust the seat back angle so that the driver's hands rest comfortably on steering wheel; and
  vii. indicate to the system that this step is done so that this position can be stored.

Where the method is used to adjust vehicle devices for an occupant other than the driver, such as the front passenger seat, this initial adjustment process would be adapted for that purpose. For example, in step iv, the seat module could be moved front or back until the occupants' knees are a particular distance from the instrument panel. Similarly, step ii could be modified so that the vertical position is found which allows the occupant to comfortably rest his or her arm on the passenger door arm rest. Other such modifications will be apparent to those skilled in the art.

Assuming that at least some of the driver positioning data is available from the driver, it is input to the system and used to look up average cockpit device positions, with the devices then being moved to those positions. This is indicated at block 240. This process can be implemented with any of a number of different degrees of automation being used. For example, in a more basic implementation, the driver can manually adjust some or all of the cockpit devices to the desired position indicated by the averages for that driver's morphological characteristics. Alternatively, in a partially automated system, the information can be provided to a service provider, such as through General Motors' OnStar™ service with an OnStar™ representative receiving the positioning data and entering it into a remote system that communicates back to the vehicle to move the cockpit devices to the initial, average positions. In a more fully automated system, the positioning data is acquired electronically at the vehicle and used to determine the average positions with the onboard system then moving the devices to the initial positions.

The average cockpit device positions for different body sizes can be predetermined by design engineers using techniques commonly known in the art. This can be done, for example, using ergonomic models and/or clinical information, or other methods to reasonably model the average best position for different body types. This information can be stored in one or more lookup tables either individually for each cockpit device or as different sets of initial average arrangements of the devices. The system accesses the lookup table to obtain the positioning information and then sends signals to the cockpit controllers causing the cockpit devices to move to their determined average positions. These initial positions are also saved for the specific driver onto a storage medium, such as an EEPROM chip, or a hard drive, or any other volatile or non-volatile storage medium, either onboard or remotely depending upon the implementation used.

Based on the positioning data or the initial device positioning information, the system next determines position constraints for each of the devices, as indicated at block 250. These position constraints are specific to each person. For each cockpit device, this is preferably done using pre-loaded information concerning the positioning limits for that device. Other spatial considerations can also be taken into account when determining the position constraints, such as, for example, distance from the driver to a steering wheel mounted airbag. The position constraints describe feasible movement ranges for the cockpit devices, meaning that the ranges provide desired limits for the particular driver involved. These position constraints can be expressed as, for example, simple distance or angular measurements, such as the seat can be moved no more than four inches forwards or backwards, or vertically downward by three inches. These constraints will normally be something less than the full physical range of movement for a particular device, but need not be. Other exemplary position constraints that may be desired for a particular application of the invention include: a feasible range of distances from the center of the brake pedal to top front edge of the seat cushion; a feasible range of distances from seat back at the shoulder level to the 10 o'clock-2 o'clock position on the steering wheel; a feasible range of positions of the top of the seat back. Any other desired position constraints that limit cockpit device positions to desired ranges for the morphological characteristics of the particular driver can be used. Once these constraints are determined, the process of FIG. 2 ends, as indicated at block 260.

Figure 3:
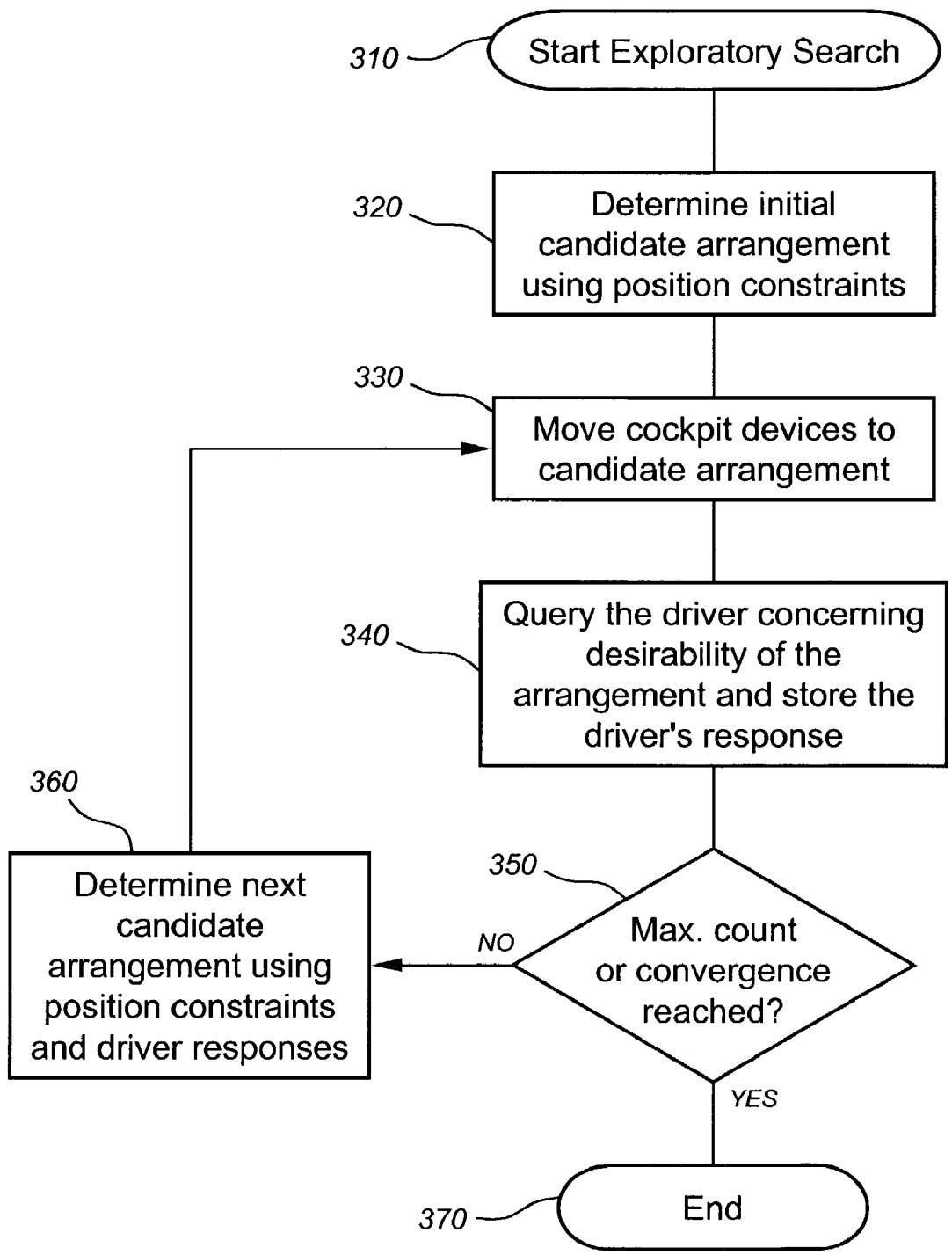
FIG. 3 is a flow chart depicting the process used in FIG. 1 to determine candidate arrangements of cockpit devices.

Turning now to FIG. 3, there will now be described the first iterative process used in the method of FIG. 1 to determine candidate arrangements of the cockpit devices. This is an exploratory search process that begins at block 310 and, in general, involves determining a candidate arrangement, moving the cockpit devices into that arrangement, determining the desirability of that arrangement, and then iteratively repeating these steps until the candidate arrangements converge sufficiently toward a single arrangement or a maximum number of iterations have occurred. Each candidate arrangement is determined using at least the position constraints, but also possibly using either the driver positioning data or initial device positions, or both. This determination is preferably done using an exploratory search routine that does not require derivatives, such as the Hooke and Jeeves method. Common exploratory search routines are the Cyclic Coordinate method or Rosenbrock's method, all of which are commonly known in the art. Alternatively, the algorithm could utilize trial-and error hill climbing algorithms such as that in OptSolve.c++ by Tech-X Corp. of Boulder, Colo. (www.techxhome.com). Penalty or barrier functions can be included to keep the search in the feasible region.

The initial candidate arrangement is determined at step 320, following which the system sends electronic signals to the cockpit device controllers instructing them to move each cockpit device to a specified position included in that arrangement. This is indicated at block 330. Once this is done, the driver is queried at step 340 as to the desirability of the arrangement from a comfort and functional standpoint. This candidate arrangement is stored along with the driver's response. Then, at block 350, a check is made to determine if the candidate arrangements have sufficiently converged or if a maximum count (number of iterations) has been reached. Neither of these conditions will be satisfied as of the first pass through the process, in which case another iteration will occur beginning with determining the next candidate arrangement at block 360. The looping through blocks 330–360 will continue a number of times, with the system each time using the exploratory search algorithm to obtain a new candidate arrangement based on the position constraints and, preferably, the driver's responses concerning previous candidate arrangements so that the suggested arrangements can converge, if possible. Convergence can be determined in any of a number of ways that will be known to those skilled in the art, including by determining for each iteration the extent to which the cockpit device positions change from the prior iteration. The maximum count can be set to a specific number or determined according to the estimated amount of time that a driver would spend exploring arrangements on his or her own. The process then ends at block 370 once convergence or the maximum count has been reached.

Querying of the driver concerning the desirability of a particular candidate arrangement can be done using a comparative approach such as by querying whether the current position is better, worse, or the same as the previous position, or, alternatively, by rating the position on a broader scale, e.g., a scale of 1–10, or by rating as better, much better, best, etc. The more levels of response available to the driver, the better the system can quickly hone in on a desirable arrangement.

Figure 4:
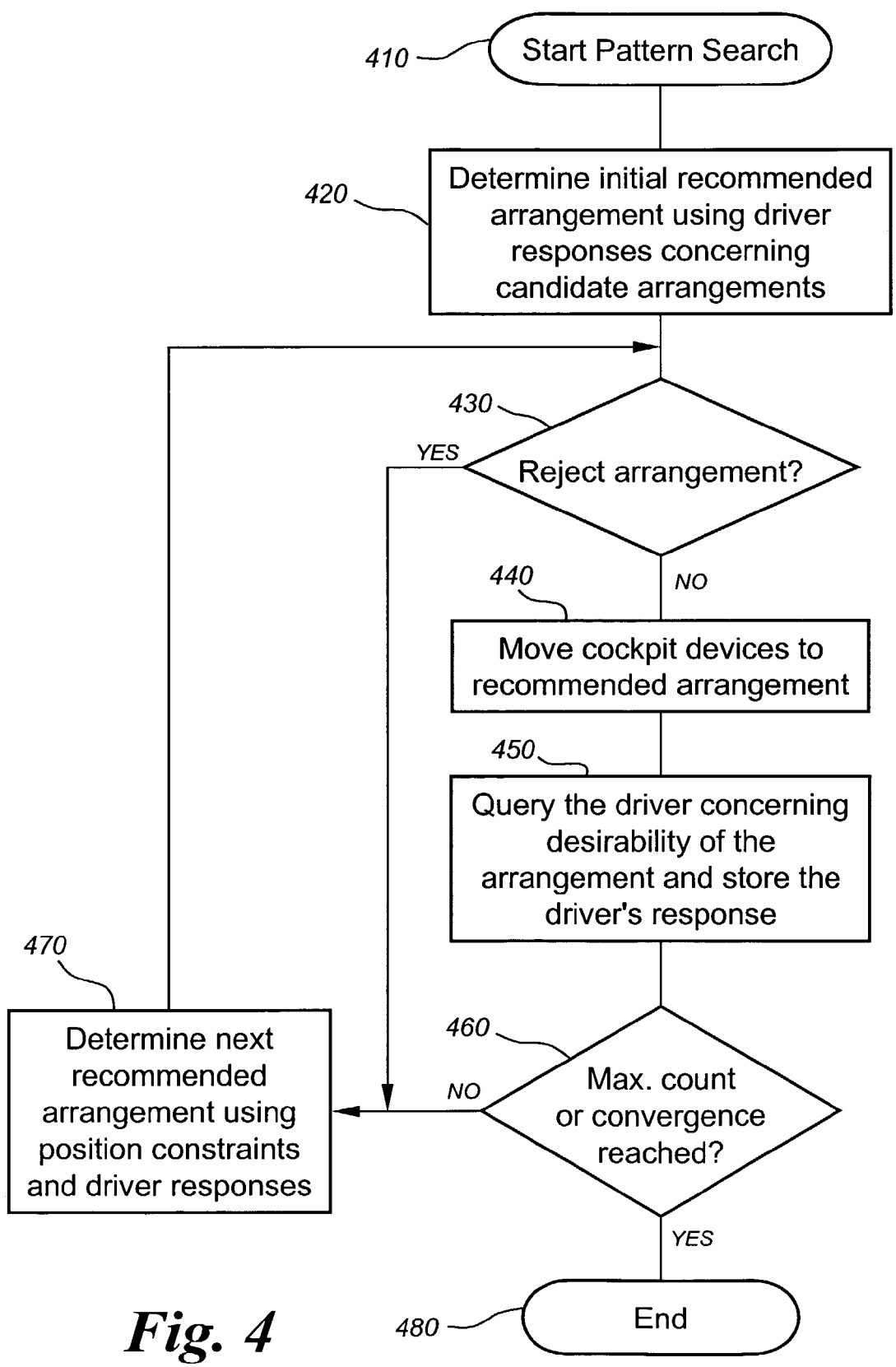
FIG. 4 is a flow chart depicting the process used in FIG. 1 to determine recommended arrangements of cockpit devices.

The final step 400 in the process of FIG. 1 is for the system to recommend particular arrangements of the cockpit devices based on the information it has stored from the prior steps. FIG. 4 details the procedure of this step 400 which generally follows the same approach as the iterative loop of FIG. 3 except that is uses a pattern search and includes a search accelerator to screen out some of the recommended arrangements. More specifically, the pattern search routine begins at block 410 following which the system determines an initial recommended arrangement using the driver responses to the prior queries concerning the different candidate arrangements. The pattern search can be a meta-heuristic that incorporates all the past data collected in search of a recommended arrangement of the cockpit devices. The system determines a potential recommended arrangement by utilizing all of the cockpit device constraints, coupled with any other desired spatial constraints, and inputs these values into the meta-heuristic. The pattern search allows the system to model the driver's comfort with the model being updated during each iteration of the loop to incorporate new information learned concerning the driver's comfort.

Meta-heuristics such as tabu search and scatter search techniques can be used for the pattern search. In order to reach a final desired arrangement in the minimum amount of time, the pattern search can utilize a search accelerator to help screen out undesired arrangements before they are presented to the driver for consideration. A neural network can be used for this purpose. By incorporating all of the past data concerning various arrangements and the driver's responses, the neural network can model the driver's comfort level. The neural network can evaluate each arrangement suggested by the pattern search to predict the driver's comfort level and only recommend to the driver arrangements that it predicts will be sufficiently comfortable. Also, the position and spatial constraints can ensure that only feasible arrangements are recommended to the driver. The constraints can be applied after application of the meta-heuristic and neural network or can be used as inputs to either the meta-heuristic or neural network itself and used as a part of the pattern search to generate a recommended arrangement. Rather than using a neural network as a search accelerator, multivariate regression can be used to find the least squares best-fit function that represents what the system has learned about the occupant's comfort as a function of the cockpit device positioning variables. A commercially available software package for pattern searching that uses a tabu search with a neural network accelerator is OPTQUEST™ by Decisioneering Inc. of Denver, Colo. (www.decisioneering.com).

Thus, once an initial recommended arrangement is determined at block 420, the process moves to block 430 where the arrangement is screened using the search accelerator. Assuming the recommended arrangement is not screened out, the cockpit devices are moved to the positions required by the arrangement, as indicated at block 440. Thereafter, the driver is queried concerning the desirability of the arrangement with these responses being stored for later use. This is shown at block 450 and the process next determines at step 460 whether to undergo another iteration of determining a recommended arrangement. The process will loop through another iteration unless the driver has accepted the current arrangement or the system has either determined that sufficient convergence of the arrangements have occurred or a maximum count has been reached. If another iteration is indicated, the process moves to block 470 where the system determines another recommended arrangement again using the pattern search along with position constraints, following which the process loops back to block 430 to screen the new arrangement. Once it is determined at block 460 that no more iterations are needed, the current arrangement is utilized as the final arrangement of the devices. This arrangement can be stored and associated with the particular driver so that the devices can be returned to the final arrangement any time the driver is authenticated to the system, such as through an individualized ignition key or key fob. Thereafter, the process ends at block 480.

The algorithms used to determine candidate and recommended arrangements can be resident on the vehicle's engine controller, or other such vehicle onboard computer, or can be stored and remotely such as through use of OnStar™. Alternatively, the algorithm could be loaded onto a laptop computer used at a dealership and uploaded to the computer via wire or wireless transmission.

Apart from voice recognition and the other data input approaches mentioned above, the needed inputs from the driver can be entered or obtained via other means such as the vehicle's radio buttons, a key fob, a door or window control, a laptop, a personal data assistant, a phone that transmits to the vehicle via either a hardwired connection or wirelessly, or from any other suitable storage device.

Output to the driver can be via a synthesized voice (such as can be provided via OnStar™), a voice recording resident on the vehicle that plays through the vehicle's speakers, a radio or other display, or a display on a laptop or personal data assistant that is connected to vehicle via either a transmission cable or wirelessly.

It will thus be apparent that there has been provided in accordance with the present invention a method for adjusting vehicle cockpit devices which achieves the aims and advantages specified herein. It will of course be understood that the foregoing description is of preferred exemplary embodiments of the invention and that the invention is not limited to the specific embodiments shown. Various changes and modifications will become apparent to those skilled in the art. For example, the invention can be applied to arranging vehicle interior devices for occupants other than the driver. All such variations and modifications are intended to come within the scope of the appended claims.

What is claimed is:

1. A method for adjusting a plurality of vehicle cockpit devices, comprising the steps of:
   (a) obtaining position from an occupant, determining a plurality of position constraints using the positioning data obtained from the occupant, and moving the cockpit devices to initial positions;
   (b) searching for a plurality of candidate arrangements of the cockpit devices that satisfy the position constraints, moving the cockpit devices to positions specified by each candidate arrangement, and querying the occupant concerning the desirability of each candidate arrangement, with the occupant's responses being stored for later retrieval; and
   (c) determining a plurality of recommended arrangements of the cockpit devices using the candidate arrangements and at least some of the occupant's responses, moving the cockpit devices to positions specified by each recommended arrangement and querying the occupant concerning the desirability of each recommended arrangement and selecting one of the recommended arrangements as a final positioning arrangement of the cockpit devices.

2. The method of claim 1, wherein step (a) further comprises obtaining the positioning data from measurements of the occupant.

3. The method of claim 1, wherein step (a) further comprises obtaining the positioning data from initial positioning of the cockpit devices by the occupant.

4. The method of claim 1, wherein step (a) further comprises determining, for each cockpit device, the position constraints using the positioning data and limits of movement for that cockpit device.

5. The method of claim 1, wherein step (c) further comprises searching for the recommended arrangements using a pattern search algorithm.

6. The method of claim 5, wherein the pattern search algorithm is either a tabu search or a scatter search.

7. The method of claim 5, wherein step (c) further comprises screening out some of the recommended arrangements provided by the pattern search algorithm using a search accelerator.

8. The method of claim 7, wherein the search accelerator uses either a multivariate regression algorithm or a neural network to screen out some of the recommended arrangements.

9. The method of claim 1, wherein the vehicle cockpit devices include a seat, one or more pedals, and a steering wheel.

10. A method for adjusting a plurality of vehicle cockpit devices, comprising the steps of:
    (a) obtaining positioning data from an occupant;
    (b) determining a plurality of position constraints for the vehicle cockpit devices using the positioning data and moving the cockpit devices to initial positions;
    (c) performing a plurality of iterations of (c1) to (c4) using an exploratory search algorithm:
    (c1) searching for a candidate arrangement of the cockpit devices that satisfies the position constraints;
    (c2) moving the cockpit devices to a position specified by the candidate arrangement;
    (c3) querying the occupant concerning the desirability of the candidate arrangement;
    (c4) storing candidate arrangement and the occupant's response;
    (d) performing a plurality of iterations of (d1) to (d4) using a pattern search algorithm:
    (d1) determining a recommended arrangement of the cockpit devices using data concerning at least some of the stored candidate arrangements or other recommended arrangements as well as data concerning one or more of the occupant responses;
    (d2) moving the cockpit devices to a position specified by the recommended arrangement;
    (d3) querying the occupant concerning the desirability of the recommended arrangement; and
    (d4) storing the recommended arrangement and the occupant's response; and
    (e) enabling the occupant to identify one of the recommended arrangements as a final positioning of the cockpit devices.

11. The method of claim 10, wherein step (a) further comprises obtaining the positioning data from measurements of the occupant.

12. The method of claim 10, wherein step (a) further comprises obtaining the positioning data from initial positioning of the cockpit devices by the occupant.

13. The method of claim 10, wherein step (b) further comprises determining, for each cockpit device, the position constraints using the positioning data and limits of movement for that cockpit device.

14. The method of claim 10, wherein the exploratory search algorithm uses either a cyclic coordinated method, a Hooke and Jeeves method, or a Rosenbrock method to determine the candidate arrangements.

15. The method of claim 10, wherein the pattern search algorithm is either a tabu search or a scatter search.

16. The method of claim 15, wherein step (d) further comprises screening out some of the recommended arrangements provided by the pattern search algorithm using a search accelerator.

17. The method of claim 16, wherein the search accelerator uses either a multivariate regression algorithm or a neural network to screen out some of the recommended arrangements.

18. The method of claim 10, wherein the vehicle cockpit devices include a seat, one or more pedals, and a steering wheel.

* * * * *